United States Patent
Okada

(10) Patent No.: US 9,912,900 B2
(45) Date of Patent: Mar. 6, 2018

(54) DISPLAY APPARATUS AND STORAGE MEDIUM

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/472,081

(22) Filed: Mar. 28, 2017

(65) Prior Publication Data

US 2017/0289483 A1 Oct. 5, 2017

(30) Foreign Application Priority Data

Mar. 31, 2016 (JP) .................................. 2016-072987

(51) Int. Cl.
*H04N 5/44* (2011.01)
*H04N 9/31* (2006.01)

(52) U.S. Cl.
CPC .......... *H04N 5/4403* (2013.01); *H04N 9/3179* (2013.01)

(58) Field of Classification Search
CPC .......... H04N 5/44; H04N 5/4403; H04N 9/31; H04N 9/3179; G06F 15/16; G06F 15/177; G06F 15/173
USPC ........ 348/734, 730, 744, 552; 709/224, 220, 709/217
See application file for complete search history.

(56) References Cited

U.S. PATENT DOCUMENTS

| | | | |
|---|---|---|---|
| 6,735,616 B1 * | 5/2004 | Thompson | H04L 67/025 360/79 |
| 7,506,076 B2 * | 3/2009 | Kobayashi | G03B 21/26 345/204 |
| 8,244,104 B2 * | 8/2012 | Kashiwa | G11B 27/034 386/278 |
| 8,972,573 B2 * | 3/2015 | Piemonte | G06F 13/4068 709/224 |
| 9,241,191 B2 * | 1/2016 | Shim | H04N 5/602 |

(Continued)

FOREIGN PATENT DOCUMENTS

JP 2004-208022 A 7/2004
JP 2010-191972 A 9/2010

*Primary Examiner* — Trang U Tran
(74) *Attorney, Agent, or Firm* — Canon U.S.A., Inc. IP Division

(57) ABSTRACT

A display apparatus includes a first communication unit, a second communication unit, and a control unit that controls the first and second communication units. If the display apparatus is on standby in a first standby mode in which the first and second communication units are enabled, when the control unit receives a command via communication from an external device to the first communication unit, the control unit acquires information of another display apparatus via the second communication unit and transmits the information to the external device via the first communication unit. If the display apparatus is on standby in a second standby mode in which the second communication unit is enabled, when the control unit receives a command via communication from another display apparatus to the second communication unit, the control unit transmits information of the display apparatus to the other display apparatus via the second communication unit.

8 Claims, 7 Drawing Sheets

(56) References Cited

U.S. PATENT DOCUMENTS

| | | | |
|---|---|---|---|
| 9,529,588 B2 * | 12/2016 | Maeda | G06F 8/665 |
| 2011/0115983 A1 * | 5/2011 | Nishihata | G09G 5/006 |
| | | | 348/705 |

* cited by examiner

DISPLAY APPARATUS AND STORAGE MEDIUM

BACKGROUND OF THE INVENTION

Field of the Invention

The present disclosure relates to a display apparatus and a storage medium, and, in particular, to control in a standby state.

Description of the Related Art

One of known display apparatuses is a projector (projection apparatus). A projector is used in, for example, events, and projects various images onto a large screen. Furthermore, when a plurality of projectors are used, the plurality of projectors can project respective sub-images into which one image is split to display the one image on the large screen, or can superimpose images on one another to display one bright image. In the case where a plurality of projectors are used in this way, the plurality of projectors are centrally managed, thus enabling an increase in user convenience.

A method has been disclosed in which one dedicated server computer remotely controls and manages a plurality of projectors via a network (Japanese Patent Laid-Open No. 2010-191972).

Furthermore, a method has been disclosed in which a plurality of projectors and a system control server are connected via a network and in which the system control server analyzes the state of each projector to perform calibration (Japanese Patent Laid-Open No. 2004-208022).

SUMMARY OF THE INVENTION

The present disclosure provides a display apparatus capable of communicating with an external device. The display apparatus includes a first communication unit, a second communication unit, and a control unit configured to control the first communication unit and the second communication unit. The display apparatus is capable of being on standby in a first standby mode in which the first communication unit and the second communication unit are enabled and in a second standby mode in which the second communication unit is enabled. In response to the display apparatus being on standby in the first standby mode, when the control unit receives a command via communication from the external device to the first communication unit, the control unit acquires information of another display apparatus via the second communication unit and transmits the information to the external device via the first communication unit. In response to the display apparatus being on standby in the second standby mode, when the control unit receives a command via communication from another display apparatus to the second communication unit, the control unit transmits information of the display apparatus to the other display apparatus via the second communication unit.

Further features of the present disclosure will become apparent from the following description of exemplary embodiments with reference to the attached drawings.

DESCRIPTION OF THE EMBODIMENTS

In the above-described techniques disclosed in Japanese Patent Laid-Open No. 2010-191972 and Japanese Patent Laid-Open No. 2004-208022, however, projectors are in a state capable of communicating with a server at all times in order to check the state or status of each projector, thereby increasing power consumption even in a standby state in which no projection is performed.

Thus, the present disclosure provides a display apparatus that enables a plurality of display apparatuses to be managed and further enables a reduction in power consumption in a standby state.

Exemplary embodiments will be described in detail below with reference to the accompanying drawings.

First Embodiment

A first embodiment will be described with reference to FIGS. 1 to 3.

Figure 1:
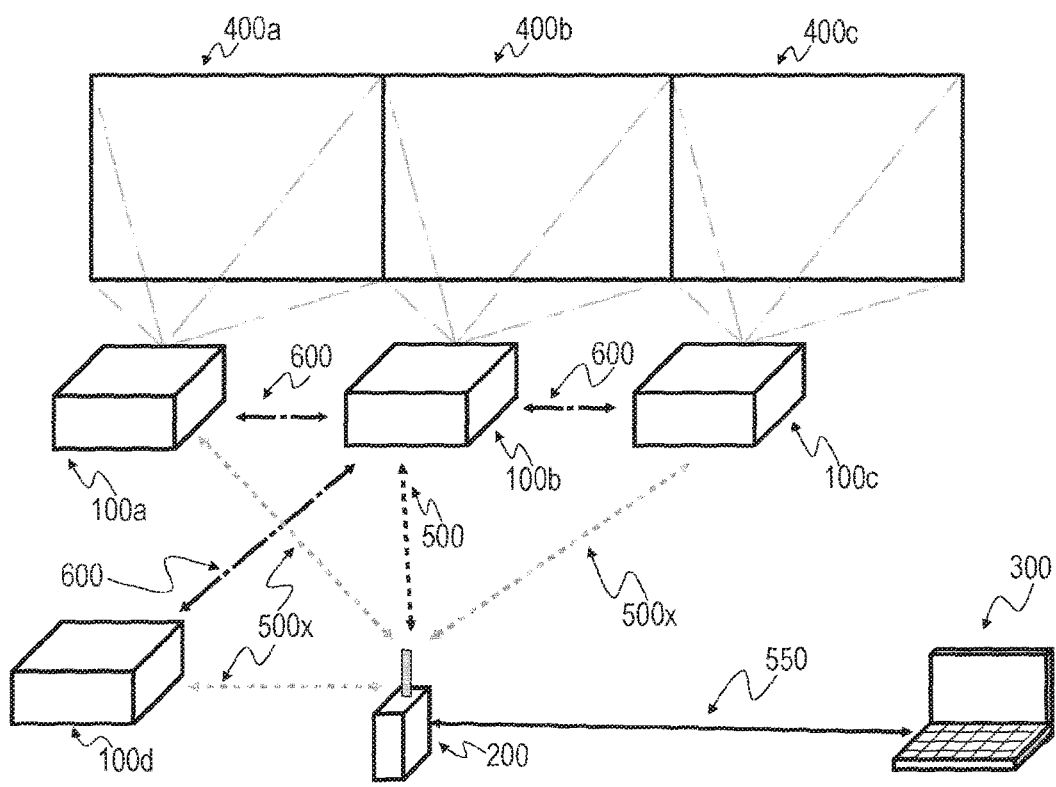
FIG. 1 illustrates an entire configuration of a projection system according to a first embodiment.

FIG. 1 illustrates an entire configuration of a projection system (display system) according to the first embodiment. The display system can be constituted by a plurality of projection apparatuses (display apparatuses). In this embodiment, projection apparatuses 100a, 100b, and 100c are installed to respectively provide projected images 400a, 400b, and 400c, that is, the projection apparatuses 100a, 100b, and 100c are in a state in which they are capable of multi-projection. A projection apparatus 100d is installed without being prepared for multi-projection.

Figure 2:
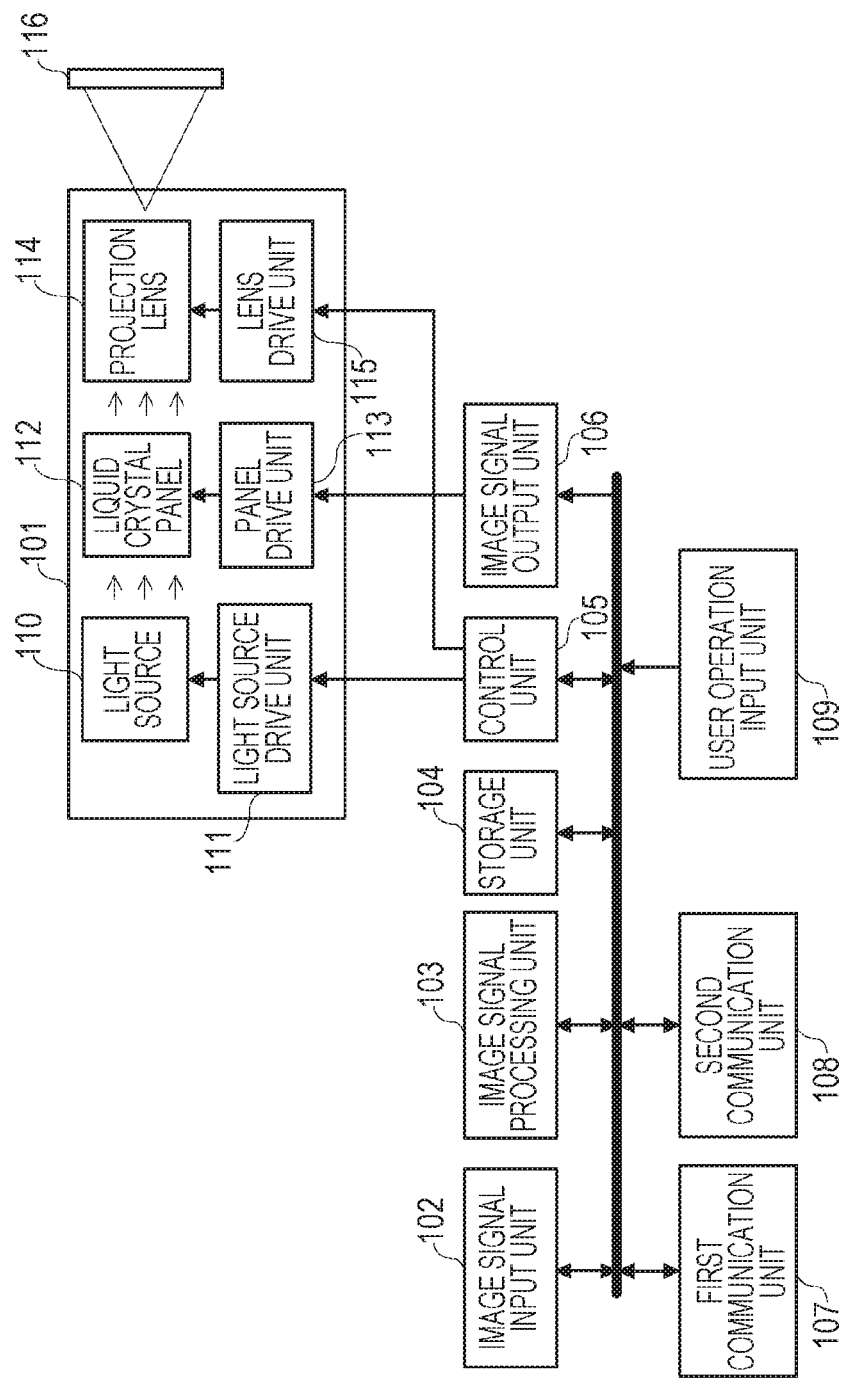
FIG. 2 illustrates a schematic configuration of an example projection apparatus.

FIG. 2 illustrates a schematic configuration of the projection apparatus 100a. The projection apparatuses 100b, 100c, and 100d have the same configuration as the projection apparatus 100a.

The projection apparatus 100a includes a projection unit 101, an image signal input unit 102, an image signal processing unit 103, a storage unit 104, a control unit 105, an image signal output unit 106, a first communication unit 107, a second communication unit 108, and a user operation input unit 109.

An image input signal from outside is input to the image signal input unit 102 on the basis of a control signal from the control unit 105, and the image signal input unit 102 outputs the input image input signal to the image signal processing unit 103 and the storage unit 104. The image signal processing unit 103 performs predetermined image processing on the image input signal on the basis of a control signal from the control unit 105. Examples of image processing include adjusting image quality, such as adjusting the brightness, contrast, and color shades of an image, and enhancing edges, and scaling an image. The storage unit 104 stores, for example, a program run by the control unit 105, adjustment parameters for the predetermined image processing performed by the image signal processing unit 103, and image signals from the image signal input unit 102 and the image signal processing unit 103. The image signal output unit 106 outputs, on the basis of a control signal from the control unit 105, an image signal processed by the image signal processing unit 103 and an image signal that has been processed by the image signal processing unit 103 and stored in the storage unit 104 to a panel drive unit 113.

The first communication unit 107 is a transmission and reception unit for wireless communication complying with the Institute of Electrical and Electronics Engineers (IEEE) 802.11 standards, for example. Examples of the IEEE 802.11 standards include various standards, such as IEEE 802.11b/a/g/n/ac/ad. The IEEE 802.11n and the IEEE 802.11ac respectively specify a maximum transmission rate of 600 Mbps and a maximum transmission rate of 6.9 Gbps. In comparison with the second communication unit 108 to be described, the transmission rate is high, but power consumption is around a few watts and is high.

The second communication unit 108 is a transmission and reception unit for short-range wireless communication, such as Bluetooth (registered trademark) or ZigBee (registered trademark). In Bluetooth, one of communication modes is Bluetooth low energy (LE) which specifies a transmission rate of 1 Mbps. In comparison with the first communication unit 107, the transmission rate is low, but power consumption is a few milliwatts and is low. In this embodiment, the second communication unit 108 is described as a Bluetooth-enabled unit.

The user operation input unit 109 receives an operation instruction from a user via, for example, a remote control or operation buttons provided on the projection apparatus body and outputs the instruction to the control unit 105.

The projection unit 101 includes a light source 110, a light source drive unit 111, a liquid crystal panel 112, the panel drive unit 113, a projection lens 114, and a lens drive unit 115.

The light source 110 is a light source that outputs white light, and, for example, a high-pressure mercury lamp is used. The light source drive unit 111 controls drive power to the light source 110 on the basis of a control signal from the control unit 105 to turn on or turn off the light source 110. Light from the light source 110 is split by a dichroic mirror, which is not illustrated, into a green (hereinafter referred to as G) component light beam, a red (hereinafter referred to as R) component light beam, and a blue (hereinafter referred to as B) component light beam. Each of the split G, R, and B component light beams passes through a polarization beam splitter, which is not illustrated, to illuminate the liquid crystal panel 112. The panel drive unit 113 generates a drive signal for driving the liquid crystal panel 112 on the basis of a control signal from the control unit 105 and an image signal output from the image signal output unit 106.

The polarization of each of the G, R, and B component light beams is controlled by the liquid crystal panel 112 compatible with each color in accordance with a drive signal for each color from the panel drive unit 113. The light beam whose polarization has been controlled travels back to the polarization beam splitter again and is split, in accordance with a polarization state, into a light beam that is supplied as image light to a cross prism, which is not illustrated, and a light beam that travels back in a light source direction.

The cross prism, which is not illustrated, combines the G, R, and B component light beams to supply combined light as image light to the projection lens 114.

The lens drive unit 115 adjusts the focus and zoom magnification of the projection lens 114 on the basis of a control signal from the control unit 105. The projection lens 114 projects the supplied combined light onto a screen 116 at a certain magnification to display an image.

The projection apparatus 100a illustrated in FIG. 2, and the projection apparatuses 100b, 100c, and 100d having the same configuration as the projection apparatus 100a can select a first standby mode in which each projection apparatus can be on standby with the first communication unit 107 and the second communication unit 108 being enabled, or a second standby mode in which each projection apparatus can be on standby with the second communication unit 108 being enabled. Here, in the present disclosure, although power is supplied to each projection apparatus, a state in which no image is projected is defined as a standby state.

The projection apparatus 100b is set to be put into a state capable of communication via the first communication unit 107 of the projection apparatus 100b and the second communication unit 108 of the projection apparatus 100b by the control unit 105 of the projection apparatus 100b and is on standby in the first standby mode. That is, the projection apparatus 100b can communicate with an access point 200 for wireless communication (wireless communication 500) via the first communication unit 107 of the projection apparatus 100b and is in a state capable of communicating with an external device 300 (for example, a personal computer (PC)) connected to the access point 200 via wired communication 550.

On the other hand, the projection apparatuses 100a, 100c, and 100d are set to be put into states capable of communication via the respective second communication units 108 with the respective first communication units 107 being OFF (with wireless communication 500x being OFF) by the respective control units 105 and are on standby in the second standby mode. That is, the projection apparatuses 100a, 100b, 100c, and 100d are in states capable of communicating with one another via the respective second communication units 108 (short-range wireless communication 600). A network of communication among the projection apparatuses via the respective second communication units 108 is constructed around the projection apparatus 100b being on standby in the first standby mode. That is, a short-range wireless communication network is constructed so that the projection apparatus 100b serves as a master of the short-range wireless communication network established by the second communication units 108, and so that the other projection apparatuses 100a, 100c, and 100d being on standby in the second standby mode each serve as a slave.

This construction enables the other projection apparatuses 100a, 100c, and 100d being on standby in the second standby mode to communicate with the external device 300 via the projection apparatus 100b. Furthermore, only one projection apparatus is on standby in the first standby mode in which power consumption is high, and the other projection apparatuses can be on standby in the second standby mode in which power consumption is low, therefore enabling a reduction in power consumption in a standby state in the projection system.

In the projection system according to this embodiment, with respect to the case where the state, history information, or the like of each projection apparatus is acquired from the external device 300, operations performed by the control units 105 according to this embodiment will be described with reference to a flowchart of FIG. 3. A process is executed by each control unit 105 configured as a computer including a central processing unit (CPU), an integrated circuit (IC), or the like in accordance with a display apparatus control program that is a computer program.

The control unit 105 of the projection apparatus 100b being on standby in the first standby mode operates in a flow from S101 to S106, and the respective control units 105 of the projection apparatuses 100a, 100c, and 100d being on standby in the second standby mode operate in a flow from S201 to S203.

First, the flow from S101 to S106 will be described.

S101 is a step of checking whether there is a communication from the external device 300 to the first communication unit 107 of the projection apparatus 100b. If there is no communication, it is continuously checked whether there is a communication from the external device 300. If there is a communication, the flow proceeds to S102.

In S102, the received communication is decoded, and it is checked whether the decoded communication is a communication to another projection apparatus other than the projection apparatus 100b. If the decoded communication is a communication to another projection apparatus, the flow proceeds to S104. If the decoded communication is not a communication to another projection apparatus, the flow proceeds to S103.

In S103, a process based on the communication is performed. For example, a command or the like for acquiring the state, history information, or the like of the projection apparatus is received, and the state, history information, or the like of the projection apparatus 100b is acquired in accordance with the command and the like.

In S104, the communication to the other projection apparatus specified by the external device 300 and being on standby in the second standby mode is transmitted via the second communication unit 108 of the projection apparatus 100b. For example, the communication is a command or the like for acquiring the state, history information, or the like of the other projection apparatus.

In S105, it is checked, via the second communication unit 108 of the projection apparatus 100b, whether there is a communication from the other projection apparatus. If there is a communication from the other projection apparatus, the flow proceeds to S106. If there is no communication from the other projection apparatus, it is continuously checked whether there is a communication from the other projection apparatus.

In S106, a result obtained by performing the process based on the communication, that is, the state or history information of the projection apparatus 100b, or the state or history information of the other projection apparatus is communicated to the external device 300 via the first communication unit 107. When the communication is completed, the flow returns to S101.

Next, the flow from S201 to S203 will be described.

S201 is a step of checking, in the projection apparatuses 100a, 100c, and 100d, whether there are communications via the respective second communication units 108 from the projection apparatus 100b, which serves as a master of a short-range wireless communication network, being on standby in the first standby mode. In each projection apparatus, if there is no communication, it is continuously checked whether there is a communication from the projection apparatus 100b. If there is a communication, the flow proceeds to S202.

In S202, the control units 105 perform processes based on respective communications. For example, each control unit 105 acquires the state, history information, or the like of its own projection apparatus.

In S203, results obtained by performing the processes based on the communications, that is, the states or history information of the respective projection apparatuses are communicated to the projection apparatus 100b via the respective second communication units 108. When the communication is completed, the flow returns to S201.

As described above, the projection apparatus 100b being on standby in the first standby mode can communicate with the external device 300, and the other projection apparatuses 100a, 100c, and 100d being on standby in the second standby mode can communicate with the external device 300 via the projection apparatus 100b.

When the projection apparatuses operate in the above-described flows, the state or history information of each projection apparatus can be acquired from the external device 300. Examples of the information include the length of time that the light source used in each projection apparatus has operated, the brightness of the light source or a projected image, the size of the projected image, the projection magnification of the projection lens, the temperature of the projection apparatus, settings information, identification information of the projection apparatus, a history of errors having occurred in the projection apparatus, and a history of warnings. The information is small in the amount of data, thus enabling the information to be transmitted and received in a short time even if the information is communicated via short-range wireless communication.

Here, the lifetime of the light source used in each projection apparatus is, for example, around 3000 hours, the brightness of the light source decreases as the length of time that the light source has been used increases, and the light source finally does not light up. In one or more embodiments, in the case where multi-projection is performed, projected images provided by the respective projection apparatuses have the same degree of brightness. The lengths of time that the light sources have operated or pieces of brightness information of the light sources or projected images are acquired, and it can thus be checked in advance whether the projected images have the same degree of brightness.

Furthermore, when information, such as the temperature of each projection apparatus, settings information, identification information of the projection apparatus, a history of errors having occurred in the projection apparatus, or a history of warnings, is acquired, it can be checked, before activation of the projection apparatus, whether maintenance of the projection apparatus is necessary.

Thus, when the states of the projection apparatuses are acquired from the external device 300 before the projection apparatuses are activated, it can be checked whether the projection apparatuses are in an appropriate state in multi-projection to be performed. If it is determined, from the acquired information, that a projection apparatus among the projection apparatuses is not in an appropriate state in multi-projection, the projection apparatus can be changed or maintenance thereof can be performed without activating each projection apparatus. For example, in the case where the characteristics of the projection apparatus 100a are different from those of the projection apparatuses 100b and 100c and where the characteristics of the projection apparatus 100d are equal to those of the projection apparatuses 100b and 100c, the projection apparatus 100a is replaced with the projection apparatus 100d before projection is performed, thereby enabling an increase in the convenience of multi-projection.

Such a configuration of the projection system enables a plurality of projection apparatuses to be managed and further enables a reduction in power consumption in a standby state.

Although the state, history information, or the like of each projection apparatus is acquired in this embodiment, a command, such as an activation command or a setting command, for controlling the projection apparatus can similarly be communicated. That is, when the projection apparatus 100b receives activation commands or setting commands for the projection apparatuses 100a, 100c, and 100d, the projection apparatus 100b can transmit the activation commands or the setting commands to the projection apparatuses 100a, 100c, and 100d via the second communication unit 108. The projection apparatuses 100a, 100c, and 100d can receive the activation commands or the setting commands via the second communication unit 108 from the projection apparatus 100b. In accordance with the commands, the respective projection apparatuses can be activated, or settings thereof can be changed.

Also, with respect to stack projection in which projection is performed in such a manner that projected images provided by a plurality of projection apparatuses are superimposed on one another, when the state, history information, or the like of each projection apparatus is acquired, the size of a projected image, or a projection position can be checked in advance.

Second Embodiment

Next, a second embodiment will be described with reference to FIGS. 2 to 5.

Figure 4:
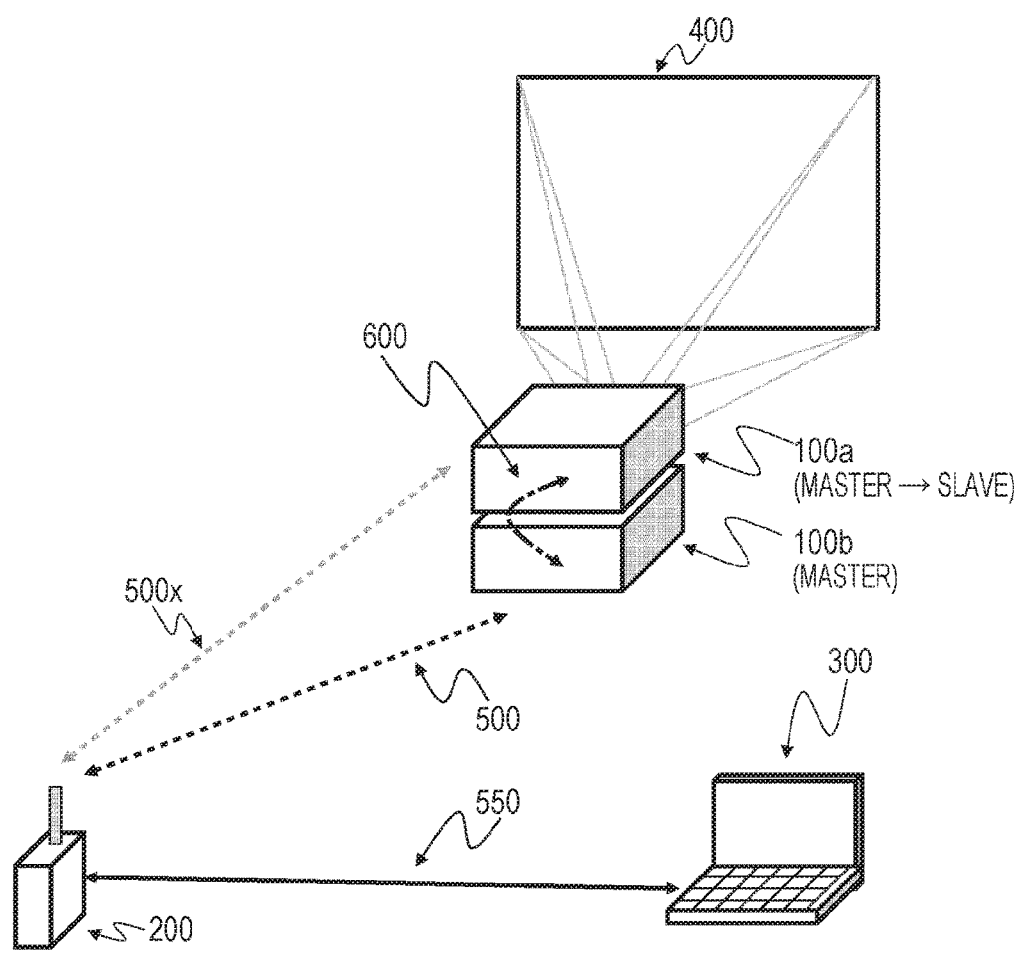
FIG. 4 illustrates an entire configuration of the projection system according to a second embodiment.

FIG. 4 illustrates an entire configuration of the projection system. As in the first embodiment, the projection apparatuses 100a and 100b have the configuration illustrated in FIG. 2. The projection apparatuses 100a and 100b can select the first standby mode in which each projection apparatus can be on standby with the first communication unit 107 and the second communication unit 108 being enabled, or the second standby mode in which each projection apparatus can be on standby with the second communication unit 108 being enabled. The components that operate in the same way as in the first embodiment are denoted by the same reference numerals, and descriptions thereof are omitted.

This embodiment differs from the first embodiment in that a plurality of projection apparatuses are installed so that stack projection can be performed in which projection is performed in such a manner that projected images 400 provided by the plurality of projection apparatuses are superimposed on one another, and in that the projection apparatuses 100a and 100b are initially in a standby state in the first standby mode.

Figure 5:
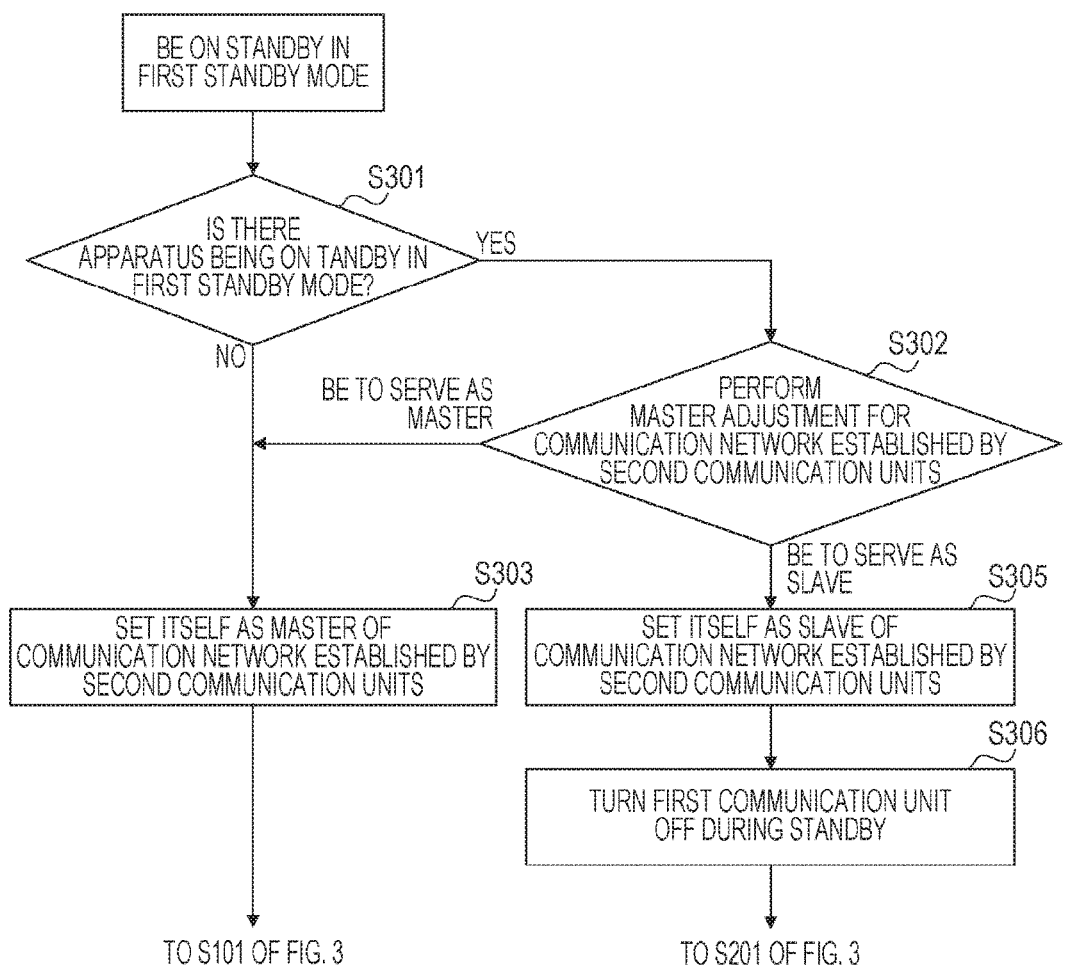
FIG. 5 is a flowchart of operations performed by projection apparatuses according to the second embodiment.

In the projection system having the above-described configuration, operations performed by the respective control units 105 according to this embodiment will be described with reference to a flowchart of FIG. 5. As in the first embodiment, a process is executed by each control unit 105 in accordance with a display apparatus control program that is a computer program.

In S301, it is checked, via each first communication unit 107 or each second communication unit 108, whether there is another projection apparatus being on standby in the first standby mode. If there is another projection apparatus, the flow proceeds to S302, and if there is no projection apparatus, the flow proceeds to S303.

In S302, since there is another projection apparatus being on standby in the first standby mode, that is, since a plurality of projection apparatuses are on standby in the first standby mode, adjustments are performed between the projection apparatuses to set which of the projection apparatuses is to be on standby in the first standby mode. In other words, a projection apparatus that is to serve as a master of a short-range wireless communication network established by the second communication units 108 is adjusted.

In such an adjustment performed on each projection apparatus, for example, the projection apparatus is set to serve as a slave if there is a projection apparatus having already served as a master. Alternatively, the projection apparatuses being on standby in the first standby mode communicate their respective master priorities set and stored in advance to each other to check their master priorities. Then, a projection apparatus may be set to serve as a master if its master priority is high, or may be set to serve as a slave if its master priority is low. Alternatively, the external device 300 may specify a projection apparatus that is to serve as a master.

In this embodiment, a description will be given on the basis of the fact that a master priority of the projection apparatus 100b is set to be higher than a master priority of the projection apparatus 100a. That is, the control unit 105 of the projection apparatus 100b is adjusted to serve as a master, and the control unit 105 of the projection apparatus 100a is adjusted to serve as a slave.

In S303, the projection apparatus adjusted to serve as a master is set to serve as a master. In this embodiment, the control unit 105 of the projection apparatus 100b serves as a master of the short-range wireless communication network established by the second communication units 108 and is on standby in the first standby mode. Subsequently, the control unit 105 proceeds to S101 of FIG. 3.

In S305, the projection apparatus adjusted to serve as a slave is set to serve as a slave. In this embodiment, the control unit 105 of the projection apparatus 100a serves as a slave of the short-range wireless communication network established by the second communication units 108 and proceeds to S306.

Figure 3:
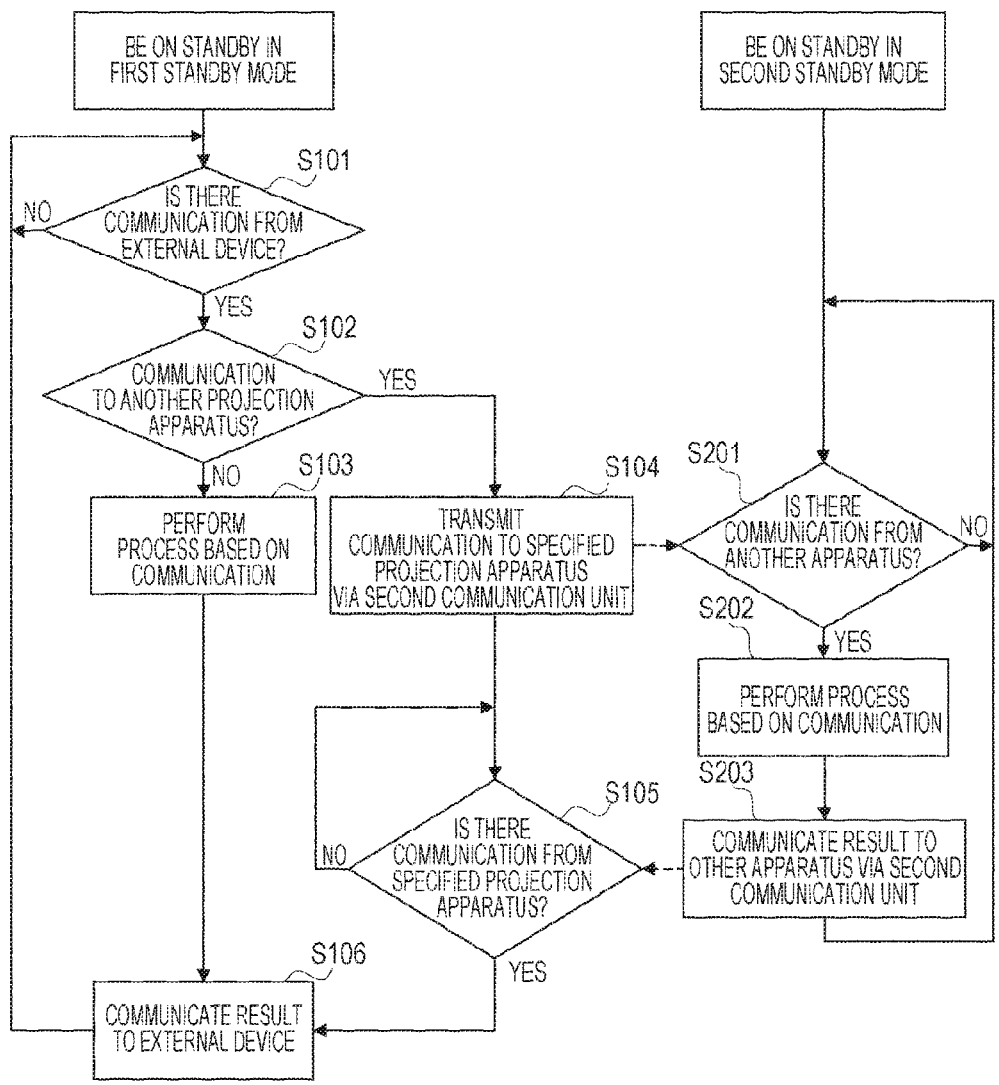
FIG. 3 is a flowchart of operations performed by example projection apparatuses.

In S306, the control unit 105 serving as a slave of the short-range wireless communication network established by the second communication units 108 turns the first communication unit 107 of its own apparatus (projection apparatus 100a in this embodiment) OFF during standby and proceeds to S201 of FIG. 3.

FIG. 4 illustrates that the projection apparatus 100b serves a master and the projection apparatus 100a becomes a slave. Thus, the projection apparatus 100a communicates with the external device 300 via the projection apparatus 100b.

As described above, a plurality of projection apparatuses can be managed, and, in the case where the plurality of projection apparatuses are on standby in the first standby mode, adjustments are performed between the projection apparatuses so that a projection apparatus to be on standby in the first standby mode is set, thereby further enabling a reduction in power consumption in a standby state.

Third Embodiment

Next, a third embodiment will be described with reference to FIGS. 2, 3, and 6.

Figure 6:
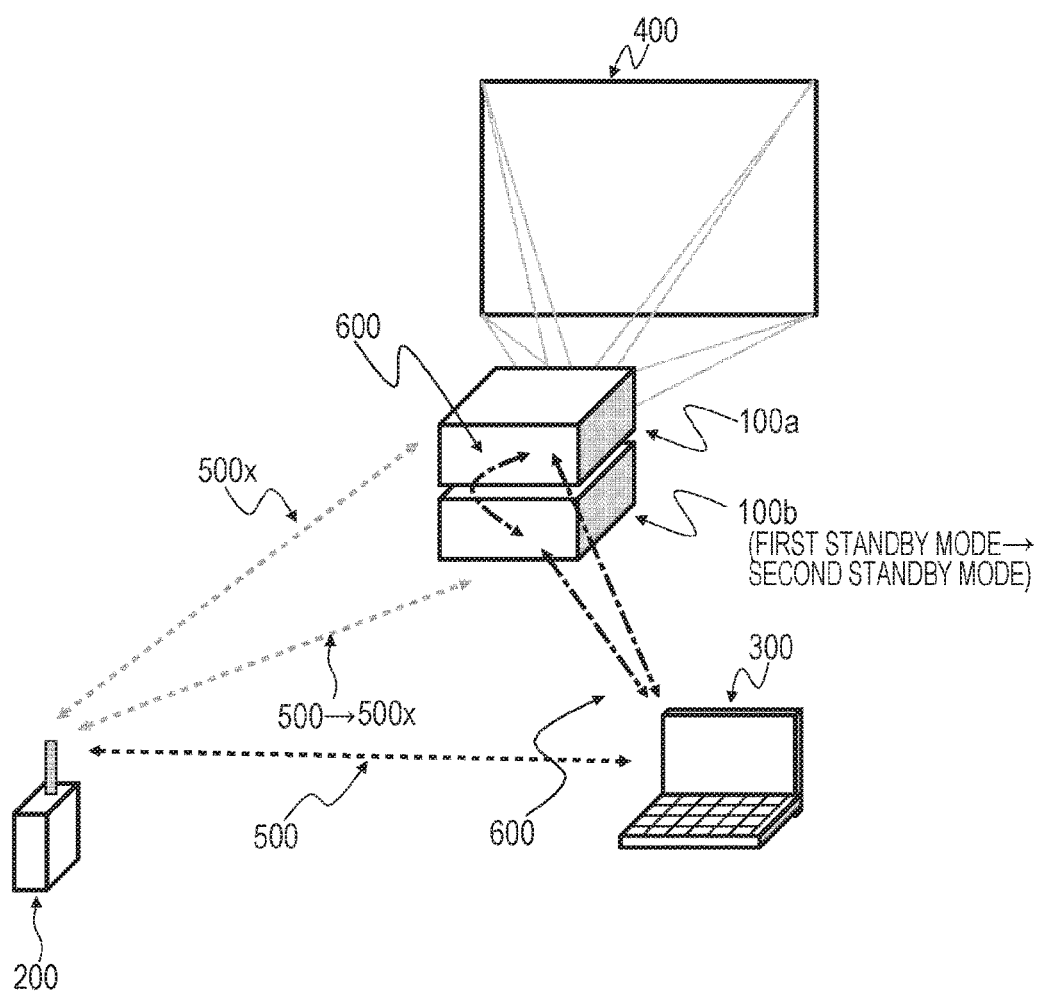
FIG. 6 illustrates an entire configuration of the projection system according to a third embodiment.

FIG. 6 illustrates an entire configuration of the projection system. As in the first embodiment, the projection apparatuses 100a and 100b have the configuration illustrated in FIG. 2 and can select the first standby mode or the second standby mode. The projection apparatus 100b is on standby in the first standby mode, and the projection apparatus 100a is on standby in the second standby mode. The components that operate in the same way as in the first embodiment are denoted by the same reference numerals, and descriptions thereof are omitted.

This embodiment differs from the first embodiment in that the external device 300 includes a communication unit capable of communicating with the respective second communication units 108 of the projection apparatuses, and in that the projection apparatuses are located within the range of short-range wireless communication, that is, the individual projection apparatuses are capable of short-range wireless communication with the external device 300.

As described above, the projection apparatus 100b is initially on standby in the first standby mode. The external device 300 is capable of short-range wireless communication and thus communicates with the projection apparatus 100b to cause the projection apparatus 100b to be on standby in the second standby mode. Communication here may be wireless communication via the first communication unit 107 of the projection apparatus 100b, or short-range wireless communication via the second communication unit 108. Subsequently, the control units 105 of the respective projection apparatuses operate in accordance with the flow for projection apparatuses being on standby in the second standby mode illustrated in FIG. 3.

That is, the external device 300 serves as a master of a short-range wireless communication network, and all the projection apparatuses can be on standby in the second standby mode, thus enabling a reduction in power consumption during standby.

FIG. 6 illustrates that the projection apparatus 100b is put into a standby state in the second standby mode.

As described above, when a plurality of projection apparatuses are managed, in the case where an external device includes a short-range wireless communication unit and is capable of short-range wireless communication, a projection apparatus being on standby in the first standby mode is caused to be on standby in the second standby mode, thereby enabling a reduction in power consumption in a standby state.

Fourth Embodiment

Next, a fourth embodiment will be described with reference to FIGS. 2, 3, and 7.

Figure 7:
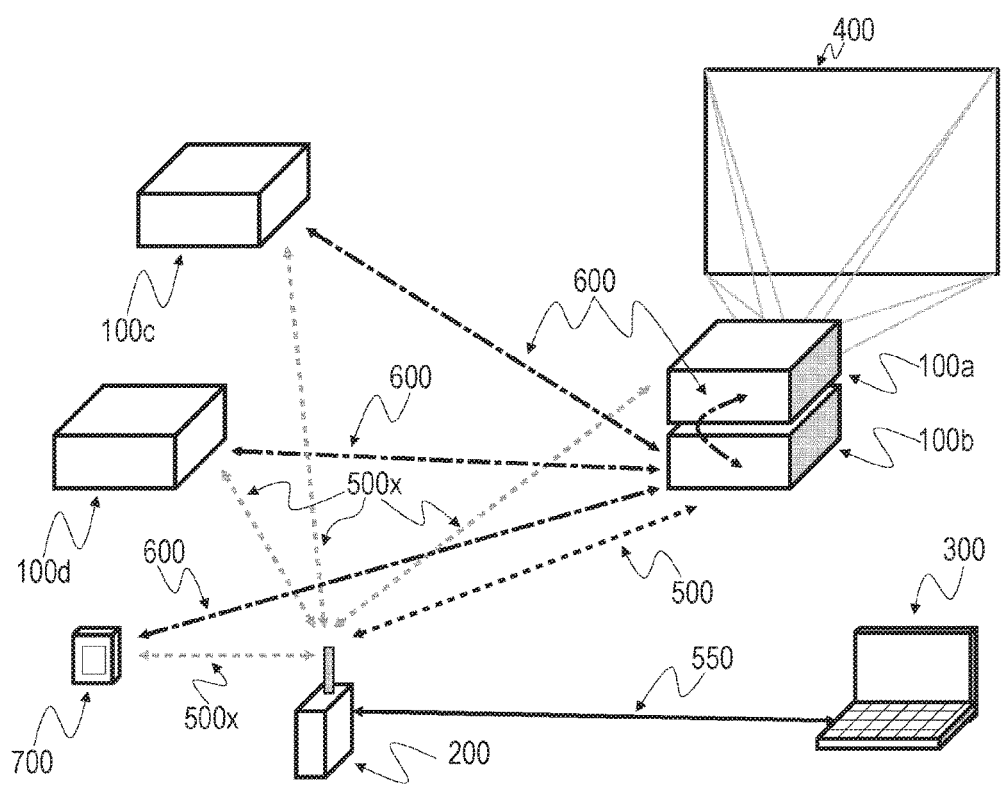
FIG. 7 illustrates an entire configuration of the projection system according to a fourth embodiment.

FIG. 7 illustrates an entire configuration of the projection system. As in the first embodiment, the projection apparatuses 100a, 100b, 100c, and 100d have the configuration illustrated in FIG. 2 and can select the first standby mode or the second standby mode. The projection apparatus 100b is on standby in the first standby mode, and the projection apparatuses 100a, 100c, and 100d are on standby in the second standby mode. The components that operate in the same way as in the first embodiment are denoted by the same reference numerals, and descriptions thereof are omitted.

This embodiment differs from the first embodiment in that there is a mobile terminal 700 (second external device). The mobile terminal 700 includes a display unit, an operation unit, and two communication units which are a communication unit capable of communicating with the first communication unit 107 of the projection apparatus 100b and a communication unit capable of communicating with the second communication units 108 of the respective projection apparatuses. Examples of a mobile terminal include a mobile phone and a tablet.

The control units 105 operate in accordance with the flows illustrated in FIG. 3.

The mobile terminal 700 is added, via the short-range wireless communication 600, to a short-range wireless communication network established by the projection apparatus 100b serving as a master and the projection apparatuses 100a, 100c, and 100d each serving as a slave. Then, as in the external device 300, the mobile terminal 700 can communicate with each projection apparatus to check the state or past history information of the projection apparatus.

Thus, when the states of projection apparatuses are acquired from the external device 300 or the mobile terminal 700 before the projection apparatuses are activated, it can be checked whether the projection apparatuses are in an appropriate state in stack projection to be performed. If it is determined, from the acquired information, that a projection apparatus among the projection apparatuses is not in an appropriate state in stack projection, the projection apparatus can be changed or maintenance thereof can be performed without activating each projection apparatus.

Furthermore, as in the external device 300, the mobile terminal 700 enables, via the short-range wireless communication 600, operations, such as giving a command to activate or stop each projection apparatus and changing settings, to be performed. Operation commands from the mobile terminal 700 are transmitted to the projection apparatus 100b serving as a master of the short-range wireless communication network, and then the operation commands are transmitted from the projection apparatus 100b to the projection apparatuses 100a, 100c, and 100d each serving as a slave.

Such a configuration of the projection system enables a plurality of projection apparatuses to be managed and further enables a reduction in power consumption in a standby state.

Although the exemplary embodiments of the present disclosure are described above, the present invention is not limited to these embodiments, and various modifications and changes can be made within the scope of the gist of the invention.

Although, as an example, the first communication unit 107 has been described as a communication unit for wireless communication, the first communication unit 107 may be a communication unit for wired communication using Ethernet (registered trademark) or the like specified by IEEE 802.3 standards.

The present disclosure can also be implemented by supplying a computer program that implements functions described in the above-described embodiments to a system or apparatus via a network or a storage medium, and by causing one or more processors of a computer in the system or apparatus to read and execute the program. The present disclosure can also be implemented by a circuit (application specific integrated circuit (ASIC), for example) that implements the functions.

When a plurality of display apparatuses are managed, the present invention is effective in reducing power consumption in a standby state.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s)

and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072987 filed Mar. 31, 2016, which is hereby incorporated by reference herein in its entirety.

What is claimed is:

1. A display apparatus capable of communicating with an external device, the display apparatus comprising:
   a first communication unit;
   a second communication unit; and
   a control unit configured to control the first communication unit and the second communication unit,
   wherein the display apparatus is capable of being on standby in a first standby mode in which the first communication unit and the second communication unit are enabled and in a second standby mode in which the second communication unit is enabled,
   wherein, in response to the display apparatus being on standby in the first standby mode, when the control unit receives a command via communication from the external device to the first communication unit, the control unit acquires information of another display apparatus via the second communication unit and transmits the information to the external device via the first communication unit, and
   wherein, in response to the display apparatus being on standby in the second standby mode, when the control unit receives a command via communication from another display apparatus to the second communication unit, the control unit transmits information of the display apparatus to the other display apparatus via the second communication unit.

2. The display apparatus according to claim 1,
   wherein the first communication unit is a wireless communication unit or a wired communication unit, and the second communication unit is a wireless communication unit different from the first communication unit, and
   wherein the second communication unit consumes less power than the first communication unit.

3. The display apparatus according to claim 1,
   wherein the information is one or more members selected from the group consisting of settings information, identification information, a history of errors, and a history of warnings.

4. The display apparatus according to claim 1,
   wherein, in response to the display apparatus being on standby in the first standby mode, the control unit is capable of receiving an activation command for the other display apparatus from the external device, and, when the control unit receives the activation command, the control unit transmits the activation command to the other display apparatus via the second communication unit, and
   wherein, in response to the display apparatus being on standby in the second standby mode, when the control unit receives an activation command via communication from the other display apparatus to the second communication unit, the control unit is capable of activating the display apparatus.

5. The display apparatus according to claim 1,
   wherein, in response to the display apparatus being on standby in the first standby mode, the control unit is capable of receiving settings information for the other display apparatus from the external device, and, when the control unit receives the settings information, the control unit transmits the settings information to the other display apparatus via the second communication unit, and
   wherein, in response to the display apparatus being on standby in the second standby mode, when the control unit receives settings information via communication from the other display apparatus to the second communication unit, the control unit is capable of changing settings of the display apparatus based on the settings information.

6. The display apparatus according to claim 1,
   wherein, in response to the display apparatus being on standby in the second standby mode, when the control unit receives a command via communication from the external device to the second communication unit, the control unit transmits information of the display apparatus to the external device or the other display apparatus via the second communication unit.

7. The display apparatus according to claim 1,
   wherein, in response to the display apparatus being on standby in the second standby mode, when the control unit receives an activation command via communication from the external device to the second communication unit, the control unit is capable of activating the display apparatus.

8. The display apparatus according to claim 1,
   wherein, in response to the display apparatus being on standby in the second standby mode, when the control unit receives settings information via communication from the external device to the second communication unit, the control unit is capable of changing settings of the display apparatus based on the settings information.

* * * * *